(12) United States Patent
Kallman et al.

(10) Patent No.: US 9,166,937 B2
(45) Date of Patent: *Oct. 20, 2015

(54) PEER-TO-PEER EMAIL

(75) Inventors: William R. Kallman, Woodland, WA (US); Donald L. Hoffman, Portland, OR (US); Mark T. Mitchell, Menlo Park, CA (US)

(73) Assignee: Scayl, Inc., Sunnyvale, CA (US)

( * ) Notice: Subject to any disclaimer, the term of this patent is extended or adjusted under 35 U.S.C. 154(b) by 489 days.

This patent is subject to a terminal disclaimer.

(21) Appl. No.: 13/586,730

(22) Filed: Aug. 15, 2012

(65) Prior Publication Data

US 2013/0218994 A1 Aug. 22, 2013

Related U.S. Application Data

(63) Continuation of application No. 12/276,114, filed on Nov. 21, 2008, now abandoned.

(60) Provisional application No. 60/989,774, filed on Nov. 21, 2007.

(51) Int. Cl.
| | | |
|---|---|---|
| *G06F 13/00* | (2006.01) | |
| *H04L 12/58* | (2006.01) | |
| *G06Q 10/10* | (2012.01) | |
| *H04L 29/08* | (2006.01) | |

(52) U.S. Cl.
CPC .............. *H04L 51/04* (2013.01); *G06Q 10/107* (2013.01); *H04L 12/5815* (2013.01); *H04L 51/043* (2013.01); *H04L 67/104* (2013.01); *H04L 67/1063* (2013.01); *H04L 67/1065* (2013.01)

(58) Field of Classification Search
CPC ... H04L 51/04; H04L 12/5815; H04L 51/043; H04L 67/104; H04L 67/1063; H04L 67/1065; G06Q 10/107
USPC .................................. 709/204–206; 707/622
See application file for complete search history.

(56) References Cited

U.S. PATENT DOCUMENTS

| | | | |
|---|---|---|---|
| 5,699,528 | A | 12/1997 | Hogan |
| 7,031,939 | B1 | 4/2006 | Gallagher et al. |
| 7,257,639 | B1 | 8/2007 | Li et al. |
| 7,536,440 | B2 | 5/2009 | Budd et al. |
| 7,849,140 | B2 | 12/2010 | Abdel-Aziz et al. |
| 2003/0105712 | A1 | 6/2003 | Bodensohn |
| 2003/0154135 | A1 | 8/2003 | Covington et al. |

(Continued)

OTHER PUBLICATIONS

Spiotto, Ann H., "Electronic Bill Payment and Presentment: A Primer", Emerging Payments Occasional Paper Series, Dec. 2001, Federal Reserve Bank of Chicago's Public Policy Studies Series, 44 pages.

(Continued)

*Primary Examiner* — Kenneth R Coulter
(74) *Attorney, Agent, or Firm* — One3 IP Management, P.C.; Justin G. Sanders; Dean G. Stathakis

(57) ABSTRACT

A peer-to-peer email system and methods are provided for distributed email distribution, prevention of SPAM, and efficient email storage. Each email client also serves as a node in the peer-to-peer system, relaying email messages and/or attachments. Large attachments may be transmitted directly from sender to receiver, and if the receiver is not online at the time the sender sends the attachment, the receiver can request the attachment from the sender at a later time.

20 Claims, 16 Drawing Sheets

(56) References Cited

U.S. PATENT DOCUMENTS

| | | |
|---|---|---|
| 2004/0064511 A1 | 4/2004 | Abdel-Aziz et al. |
| 2005/0076087 A1 | 4/2005 | Budd et al. |
| 2005/0138126 A1 | 6/2005 | Ozugur |
| 2005/0152542 A1 | 7/2005 | Zheng et al. |
| 2006/0168012 A1 | 7/2006 | Rose et al. |
| 2007/0005713 A1 | 1/2007 | LeVasseur et al. |
| 2008/0028017 A1 | 1/2008 | Garbow et al. |
| 2009/0144380 A1 | 6/2009 | Kallman et al. |
| 2009/0222450 A1 | 9/2009 | Zigelman |
| 2010/0031333 A1 | 2/2010 | Mitchell et al. |
| 2012/0150975 A1 | 6/2012 | Kallman et al. |
| 2013/0218994 A1 | 8/2013 | Kallman et al. |
| 2014/0052626 A1 | 2/2014 | Mitchell et al. |

OTHER PUBLICATIONS

Andreeff et al., "Electronic bill presentment and payment—Is it just a click away?", Economic Perspectives, 4th Q. Ed., 2001, Federal Reserve Bank of Chicago, pp. 2-16.

Stefanadis, Chris, "Why Hasn't Electronic Bill Presentment and Payment Taken Off?", Current Issues in Economics and Finance, Jul./Aug. 2002, vol. 8, No. 7, Payments Studies Function of the Research and Market Analysis Group and published by the Research and Market Analysis Group of the Federal Reserve Bank of New York, pp. 1-6.

Flynn, Shawn P., "Bill Presentment and Payment: Electronic vs. Mail", Pitney Bowes's Electronic Substitution for Mail: Model and Results; Myth and Reality, Jul. 13, 2005, Background Paper No. 9, 27 pages.

Claria, Axon White Paper brochure, Mar. 2007, 7 pages.

PEER-TO-PEER EMAIL

CROSS REFERENCE TO RELATED APPLICATIONS

This application is a continuation of U.S. patent application Ser. No. 12/276,114, filed Nov. 21, 2008 and entitled PEER-TO-PEER EMAIL, which application claims priority to U.S. Provisional Application Ser. No. 60/989,774, entitled PEER-TO-PEER EMAIL, filed Nov. 21, 2007. The contents of those applications are incorporated herein by reference for all purposes.

BACKGROUND

Existing email systems may be centrally controlled. Simple Mail Transport Protocol ("SMTP") is the de facto standard used on the internet today. A first SMTP server (e.g., mail.yin.com) may receive email messages from SMTP clients (e.g., Microsoft® Outlook, Mozilla® Thunderbird) executing on computers in the first SMTP server's domain. The email messages may include one or more recipient email addresses (e.g., john@yang.net). The first SMTP server may route the received messages to a second SMTP server on the intended recipient's domain (e.g., mail.yang.net) using known systems such as the domain name system ("DNS"). After receiving the email message, the second SMTP server may deliver the email messages to the intended recipient's mailbox, which may be stored on the second SMTP server and made available to the intended recipient over the network.

SMTP servers may be configured to restrict the size of attachments which may be sent with an email message. Other SMTP servers may limit the amount of storage space (i.e., the size of a mailbox) allocated to a user to store emails and attachments. Still other SMTP servers may not protect or offer the capability of protecting emails and attachments associated therewith from malicious or otherwise unintended recipients, either locally or while in transit over a computer network.

In addition to the above, unsolicited advertising emails ("SPAM") are ubiquitous on the Internet. It is estimated by some that as of 2007, 90 billion SPAM messages are sent every day, and that so-called "abusive email" accounts for up to 85% of incoming mail in a given email inbox.

Finally, existing email systems exhibit various inefficiencies. For instance, centralized email server farms are estimated to consume over two billion dollars worth of energy annually around the world. In addition, current methods of encoding attachments involve the use of base64, which encodes attachments as 7-bit representations, rather than traditional 8-bit. Base64 introduces approximately 30% of overhead to each attachment sent. Some estimate that attachments make up 80% of email traffic on the Internet. CPU cycles are also required to perform this encoding on the sending user's computer, as well as perform the decoding on the recipient user's computer.

DETAILED DESCRIPTION OF VARIOUS EMBODIMENTS

A Peer-to-Peer ("P2P") email and social networking system is provided for use by a plurality of users to exchange emails and attachments. Such a system may be controlled by one or more central servers, or it may be controlled by decentralized services distributed over a mesh network. Such a mesh network may comprise a plurality of node computers, each running a P2P email client according to the present disclosure. Node computers may be alternatively referred to as "peers." Emails may be stored in mailboxes residing on each node, rather than centrally located. The system may encrypt emails during transmission, and the emails may remain encrypted while stored at each node computer.

In some embodiments, the system may allow the user of each node computer to configure her email client with the user's interests (e.g., kayaking). Those interests may be communicated to a central server or decentralized distributed service, where they may be associated with the user's email address, so that potential advertisers may search by interest type, and send solicited emails to users associated with the searched-for interest types.

In other embodiments, the system may be configured to provide remote access to the user's local email when the user is away from her local computer. Such access may be provided via a webmail webpage interfacing via a secure tunnel to the user's local email store.

Figure 1:
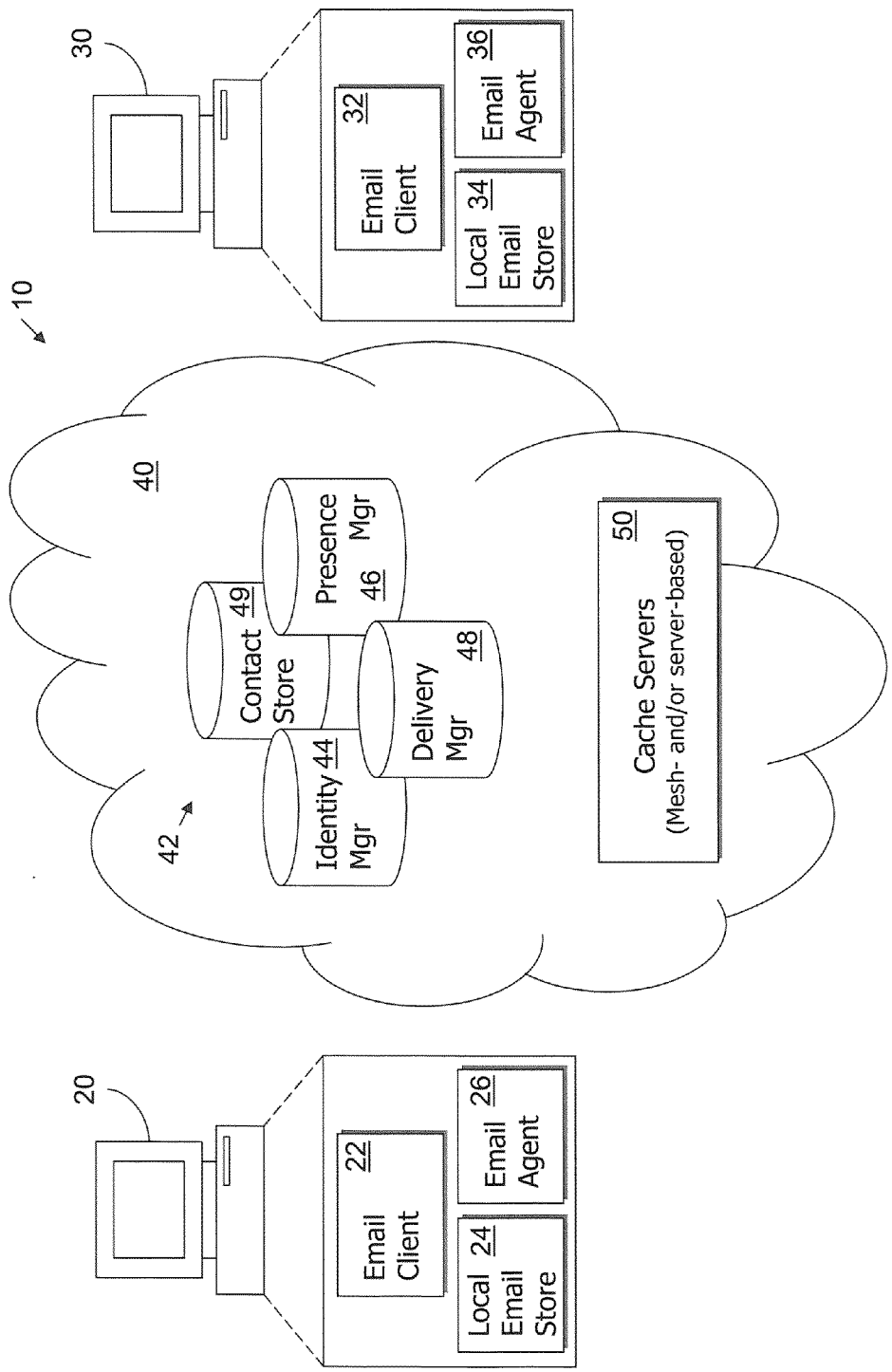
FIG. 1 depicts an example email system.

FIG. 1 depicts an example P2P email system 10 comprising node computers such as sender 20 and recipient 30. Sender 20 may be a computer controlled by a first user intending to send an email message to a recipient 30. Recipient 30 likewise may be a computer controlled by a second user who is the intended recipient of the email message. Sender 20 and recipient 30 may be connected by a network 40. Sender 20 may include an email client 22, a local email store 24, and an email agent 26. Recipient 30 likewise may include an email client 32, a local email store 34, and an email agent 36.

Network 40 may be a local or wide-area computer network, including the Internet. The P2P email system 10 may be controlled by components on network 40, such as decentralized distributed services 42 including identity manager 44, presence manager 46, delivery manager 48, and contact store 49, as well as cache servers 50. The distributed services 42 will be described in further detail below. While decentralized distributed services 42 are shown having the four components 44, 46, 48 and 49 as being separate, these components may alternatively reside on a single server, and there may be more than one server hosting one or more of these services. Moreover, additional services which are not shown (e.g., a gateway server for sending emails to traditional email domains) may also be included.

Email clients 22 and 32 may include user interfaces resembling traditional email clients (e.g., Outlook, Thunderbird), and may be configured to allow a user to draft, send and receive P2P emails. Email clients 22 and 32 may further include interfaces allowing a user to select interests (e.g., kayaking, dating), which may be communicated to decentralized distributed services 42 so that potential advertisers may communicate solicited emails to clients 22 and 32, as will be discussed further below.

Local email stores 24 and 34 may be portions of memory (e.g., on a local hard drive) which may be used to store email messages and associated attachments. In other words, local email stores 24 and 34 may serve similar roles as mailboxes on traditional SMTP servers. Messages stored in local email stores 24 and 34 may be encrypted. The amount of space allocated to a user may be configured, and in some embodiments may be limited only by the computer's storage capabilities. In addition to emails and attachments, local mail stores 24 and 34 may store interest information (a.k.a. user metadata), user contacts (e.g., the user's friends residing on P2P email system and elsewhere), user profiles (e.g., photos available for viewing, whom may view the photos, personal information and to whom it is available), group membership (e.g., open or closed groups of users of P2P email system 10 having common interests/metadata/contacts) or the like. Interest information, contacts, profiles and other similar information may be configured by a user using email clients such as 22 or 32.

Email agents 26 and 36 may be processes executing on node computers such as sender 20 or recipient 30 forming the P2P network. While a computer such as sender 20 or recipient 30 is connected to network 40 and is executing its email agent (26 or 36), that computer may be considered 'online' for purposes of the P2P network and this discussion.

Contact store 49 may be a central server or servers, or it may be a service distributed among various nodes in the P2P email system 10. It may contain information allowing peers on P2P email system 10 to locate other peers, including information similar to that stored in local email stores described above like interest information, contacts, metadata, group membership, and the like. Peers may be searched at contact store 49 using various search values, such as interests, group membership, friendship networks, personal profiles, and the like. In some embodiments, users may synchronize information stored in their local email stores 24, 34 such as metadata, profiles, and contacts with information contained in contact store 49. In other embodiments where contact store 49 is a service distributed among various nodes, there may be a central contact store (not shown) which is configured to synchronize all nodes on which contact store 49 is contained.

Cache servers 50 may comprise one or more computers on network 40 which may be used as intermediate points in email communications between computers such as sender 20 and recipient 30. Cache servers 50 may be configured to cache at least a portion of email messages, as well as attachments thereto. In some embodiments, each cache server may be a node computer, similar to sender 20 or receiver 30, forming another peer on the P2P system. Additionally or alternatively, cache servers 50 may be specialized computers maintained specifically for the purpose of caching emails. In some embodiments, cache servers may only cache attachments having a size smaller than a predetermined size (e.g., <50 Megabytes).

A given email message in transition between sender 20 and recipient 30 may be stored at a number of cache servers 50 while awaiting delivery, providing redundancy and high availability of the email message to recipient 30 in case some of the cache servers become unavailable (e.g., go offline). Moreover, cache servers 50, which may simply be peers or node computers on P2P system 10, may be configured to forward email messages to other intermediate peers closer to the recipient's destination. Additionally or alternatively, if a given cache server is going to go offline, it may forward copies of its stored pending email messages/attachments and/ or notify the P2P email system of the email's new location.

The P2P email system 10 will now be explained by example. An example email communication between two node computers 20 and 30, which are online simultaneously, is shown in FIGS. 2A-E. In step 1 of FIG. 2A, email client application 22 submits an email message created by a first user to email agent 26. In step 2 of FIG. 2B, email agent 26 communicates with identity manager 44 to verify the recipient email address(es) contained in the email message, and to obtain one or more public keys corresponding to the verified email address(es). The public keys may be used by email agent 26 to encrypt the email message and/or any the message's attachments.

Identity manager 44 may take various forms. In some embodiments, identity manager 44 may be a central database running a hash table or similar data structure for relating email addresses to public keys. In other embodiments, identity manager 44 may be a distributed hash table ("DHT"), such as Content Addressable Network ("CAN"), Chord, Kademlia, Pastry, P-Grid, Tapestry or NeoNet, to name a few. DHTs are a class of decentralized distributed systems that provide a lookup service similar to a hash table. They are well-known in the art, and therefore need not be described further here. Email addresses such as the recipient email address may comprise the names of the hash table, and the value(s) corresponding to each name may be one or more public keys. Email agents such as 36 each may possess private keys usable to decrypt messages encrypted with the one or more public keys.

Figure 2A:
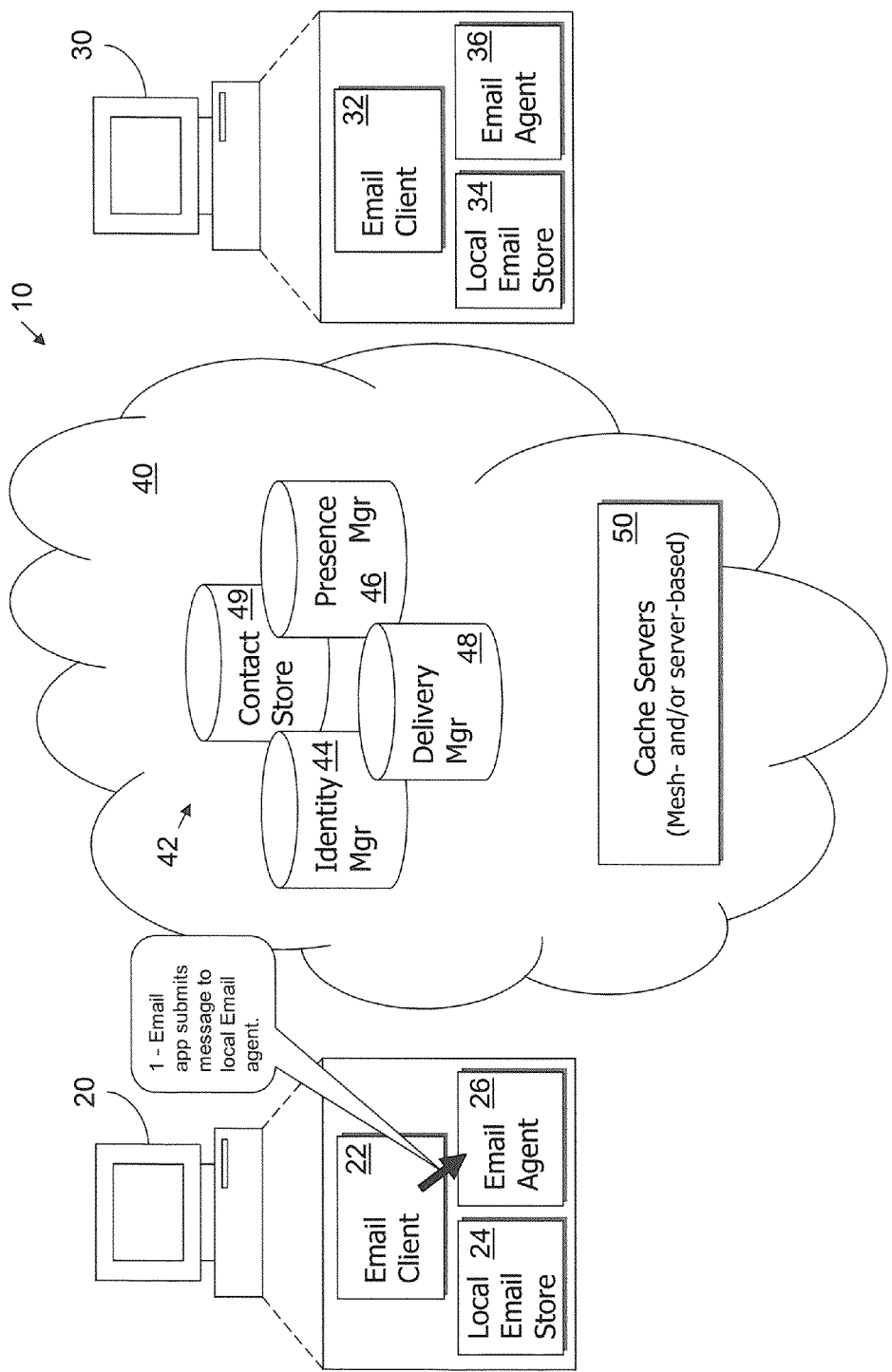
FIGS. 2A-E depict an email transmission on a system where the sender and the intended recipient are both online simultaneously.
Figure 2B:
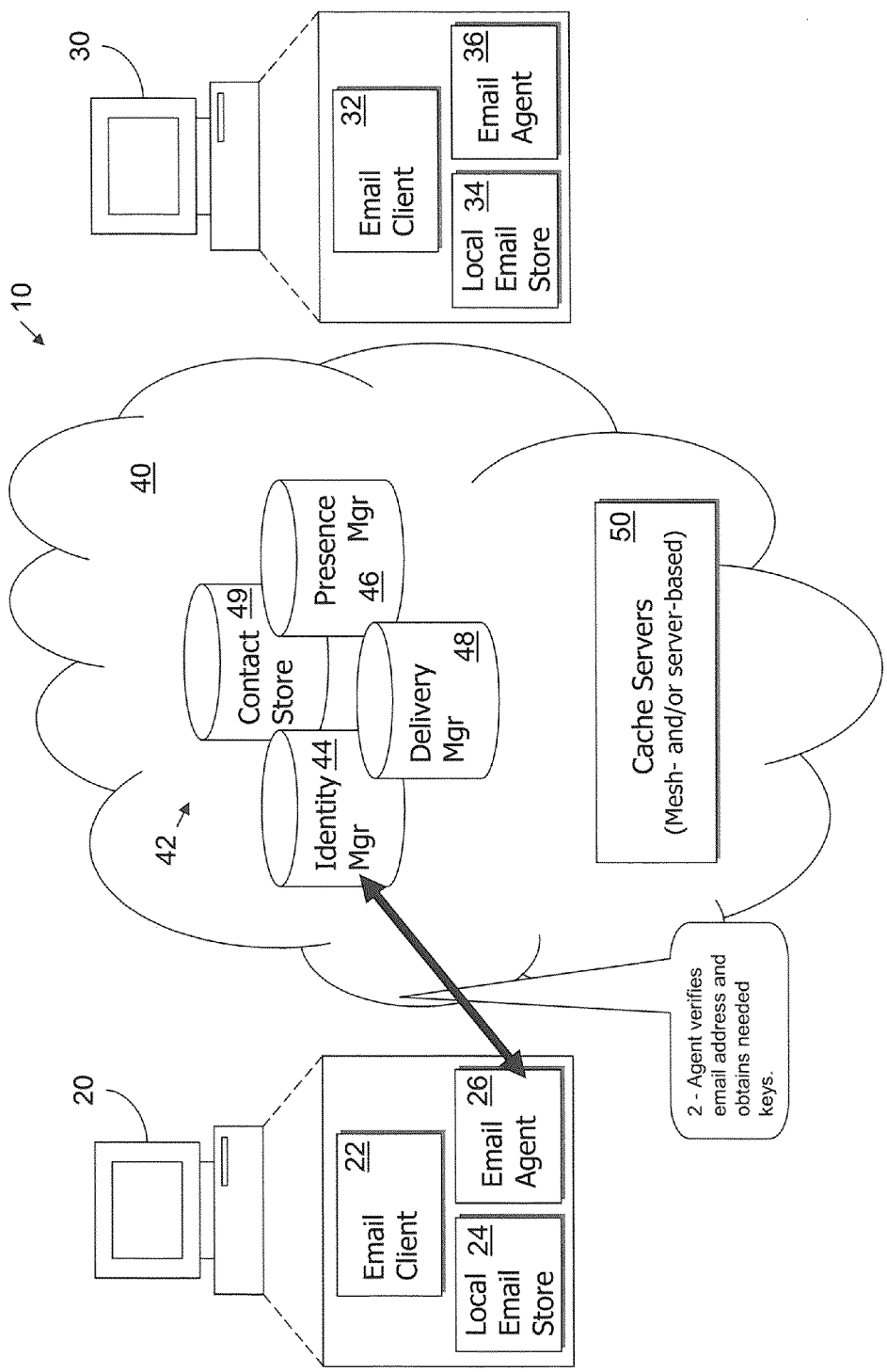
Figure 2C:
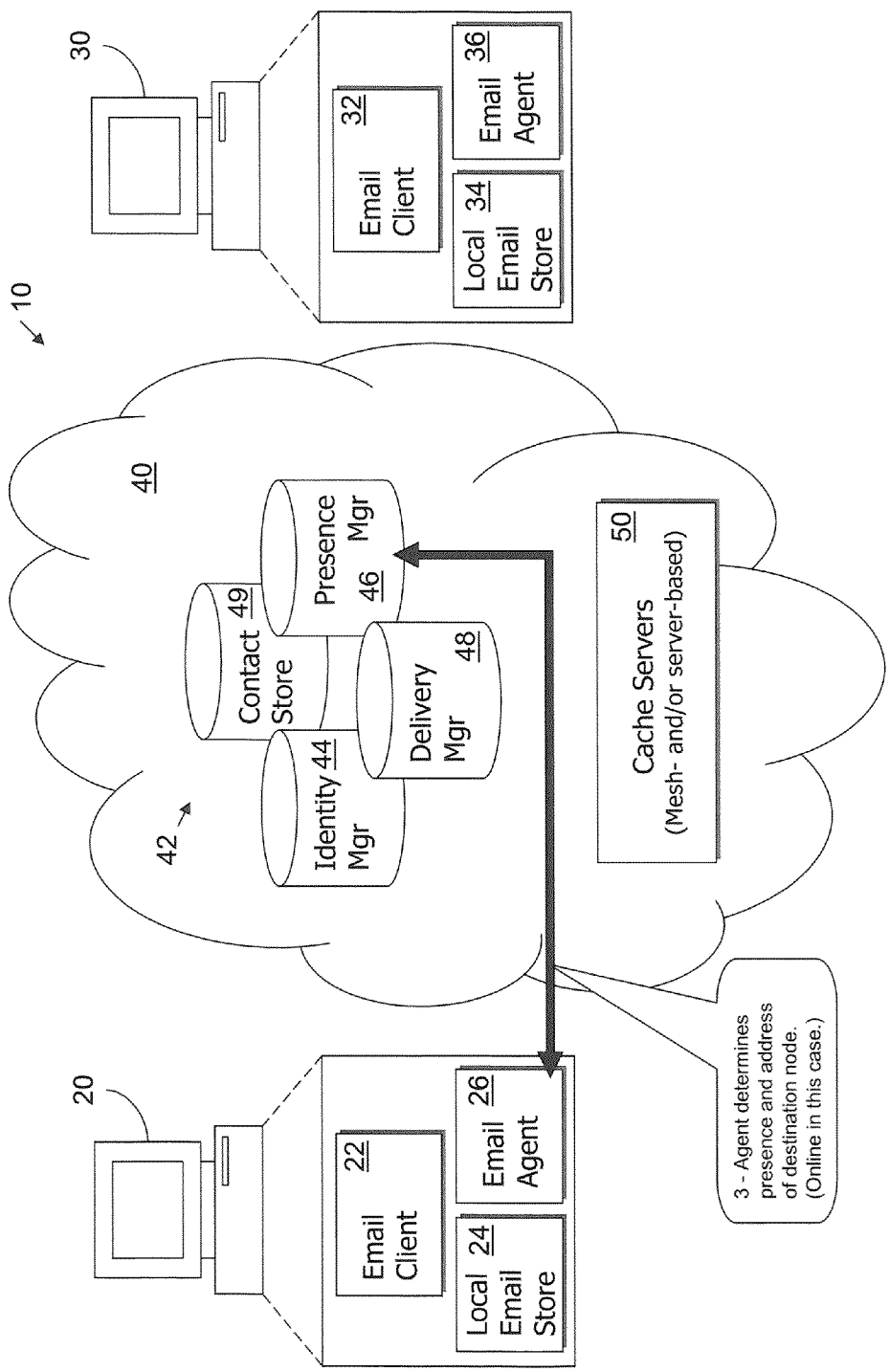

In step 3 of FIG. 2C, sender email agent 26 may communicate with presence manager 46 to determine whether recipient 30 is online. If recipient 30 is online, sender email agent 26 may obtain recipient's network address (e.g., IP address).

Presence manager 46 may be a central server configured to track the presence of email clients and make that information available to email agents such as 26 and 36. Presence manager may be a central server or decentralized service, implementing various protocols, such as the Extensible Messaging and Presence Protocol ("XMPP"), for real-time or near-real-time presence information. Jabber Instant Messaging and Presence technology is based on XMPP, and may be used in some embodiments as presence manager 46.

Figure 2D:
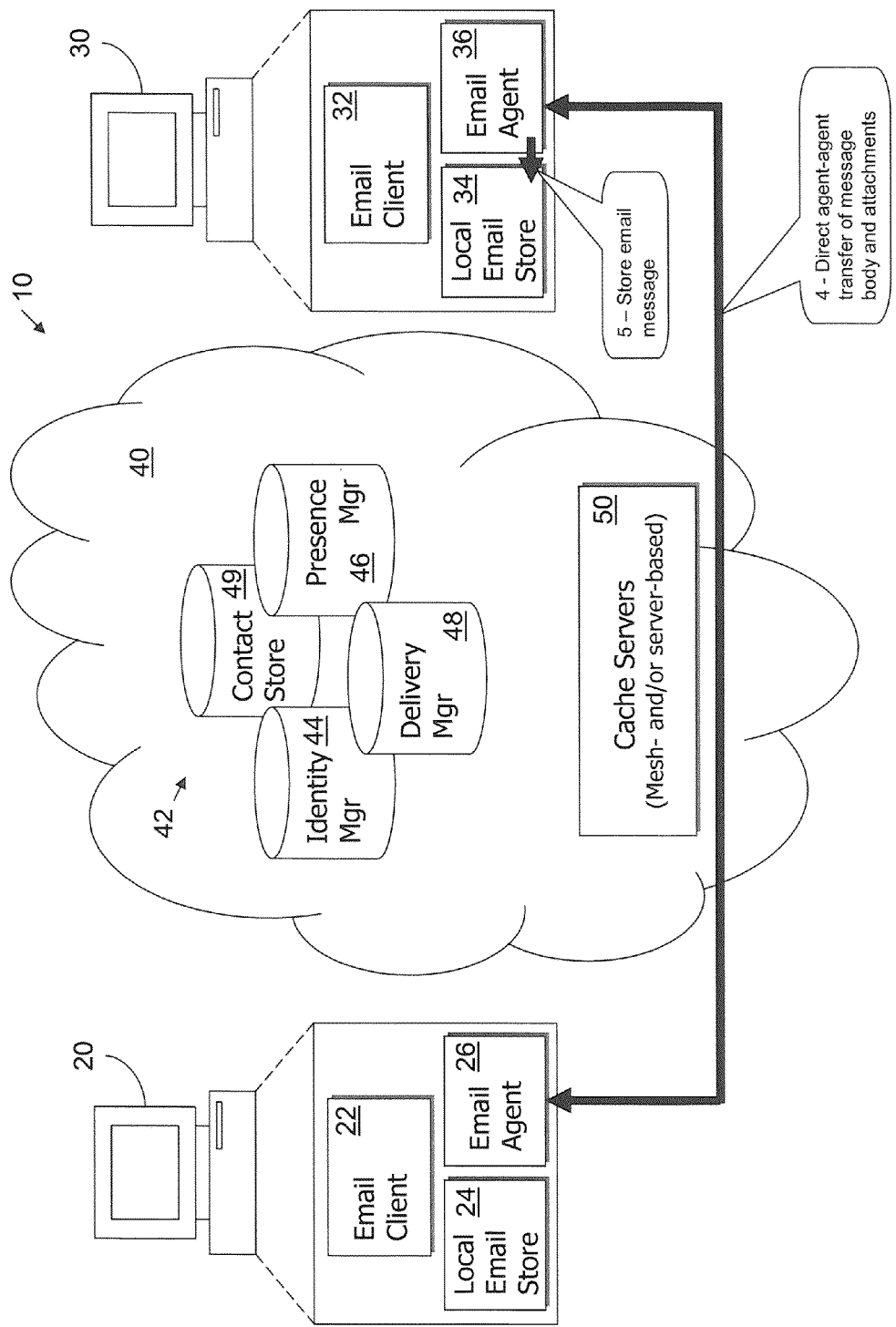

Once sender email agent 26 has obtained the network address of recipient 30 from presence manager 46, sender email agent 26 may transmit the email message and any attachments thereto directly to recipient email agent 36 in step 4 of FIG. 2D. When recipient email agent 36 receives the email message, in step 5 of FIG. 2D, it may store the email message (which may remain encrypted) and attachments thereto in local email store 34.

Figure 2E:
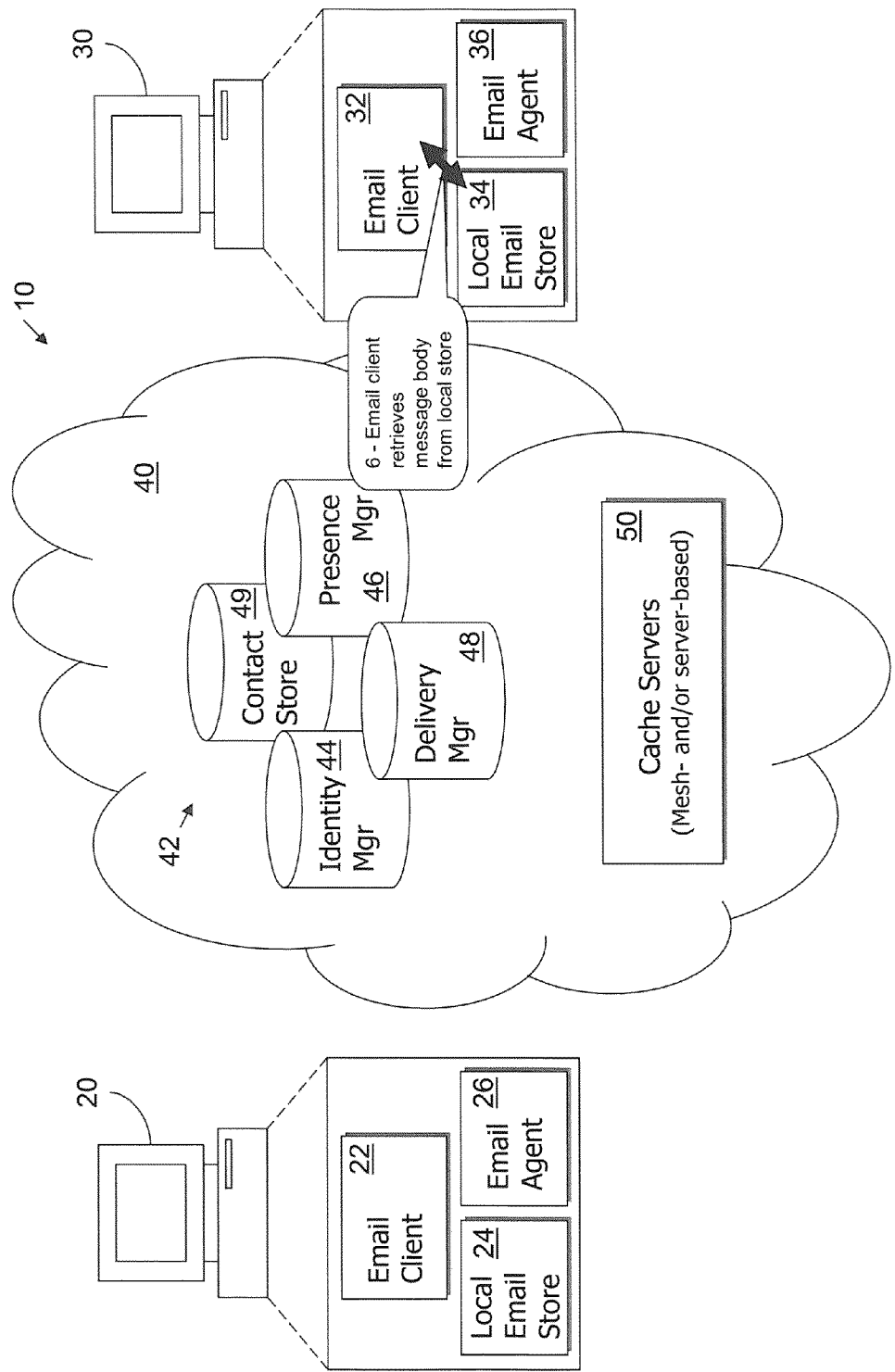

When the user of recipient 30 executes email client 32 to check her email, in step 6 of FIG. 2E, recipient email client 32 may communicate with local email store 34 to obtain all recipient's email messages, including the newest message just received, as well as any attachments thereto. If the messages are encrypted, email client 32 may use its private key, corresponding to the public key described above, to decrypt messages.

The above discussion describes an email transmission where both sender 20 and recipient 30 are online simultaneously. However, there is no guarantee that recipient 30 will be online at the moment sender 30 transmits an email message. FIGS. 3A-H and the following discussion describe one possible way an email may be transmitted between sender 20 and recipient 30 under such a scenario.

Figure 3A:
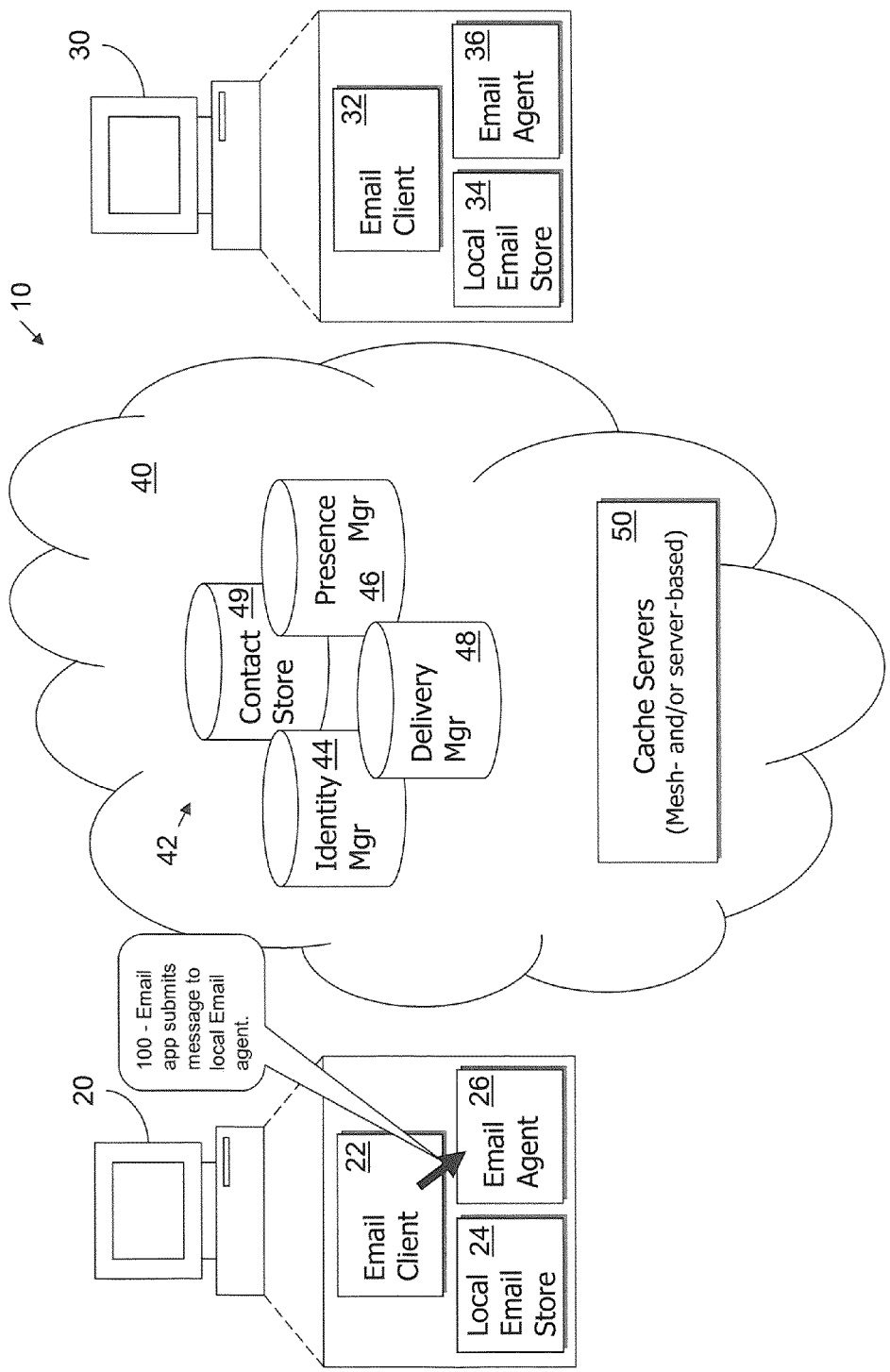
FIGS. 3A-H depict an email transmission on a system where the intended recipient is offline.
Figure 3B:
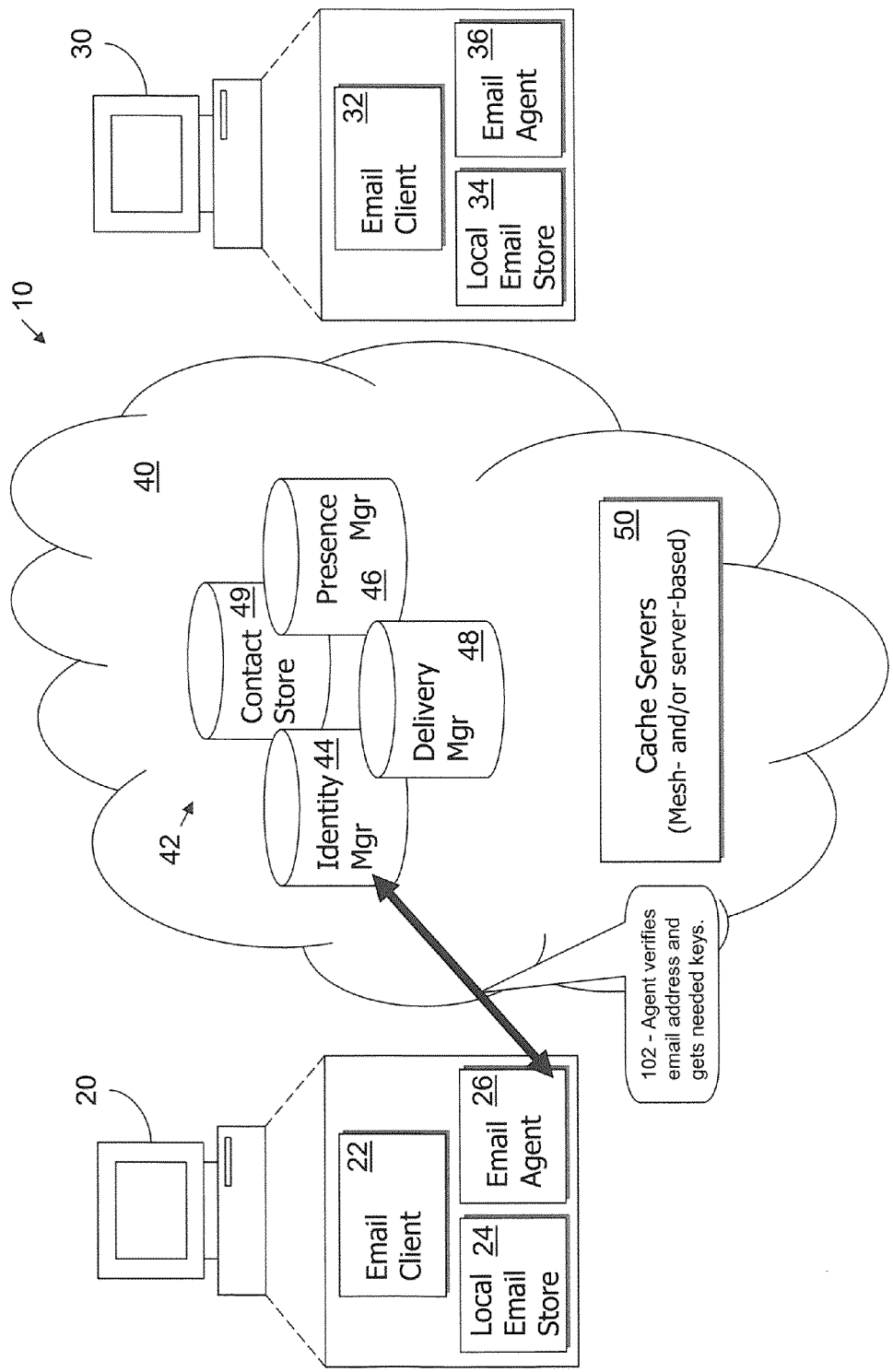
Figure 3C:
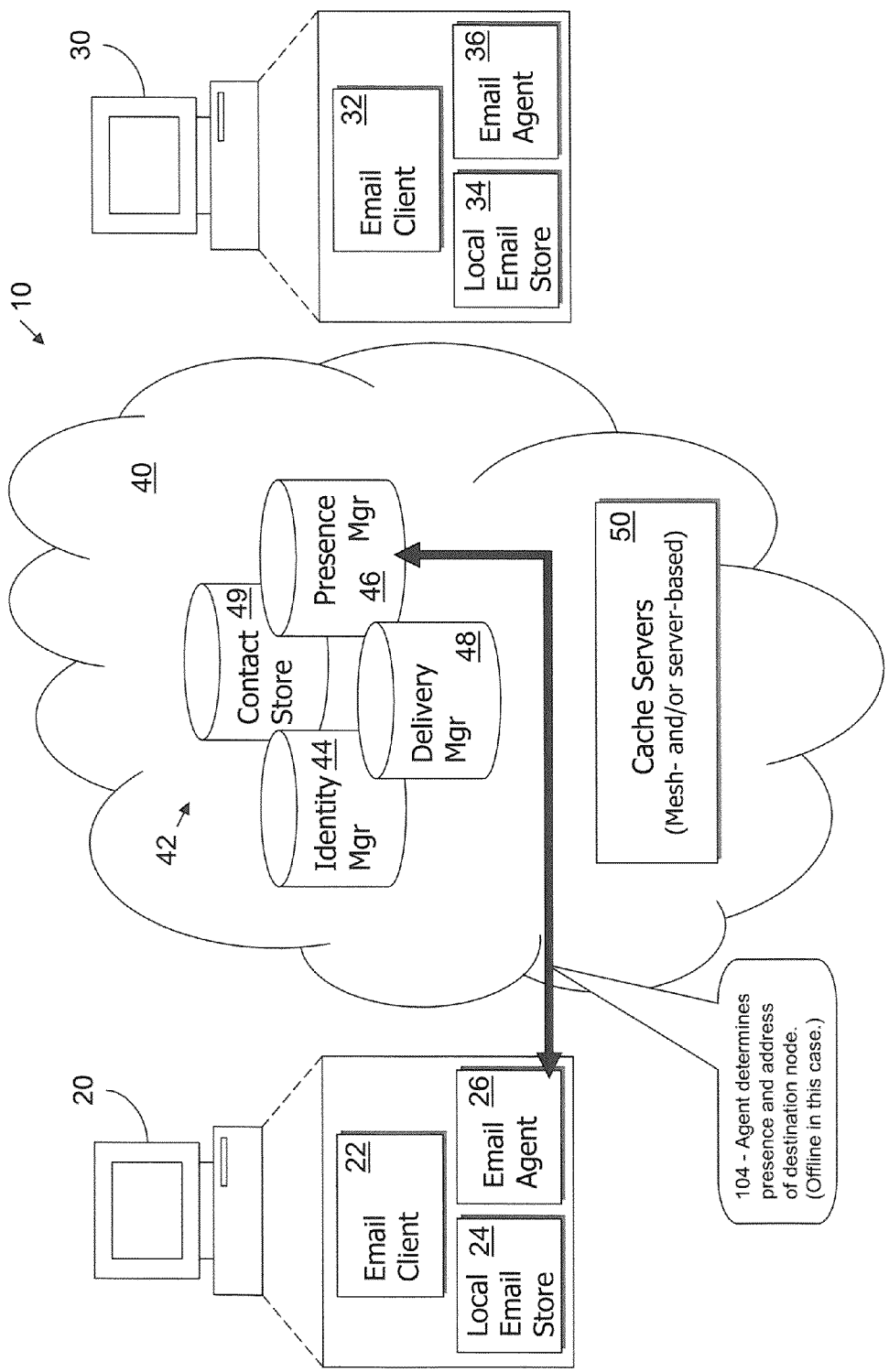
Figure 3D:
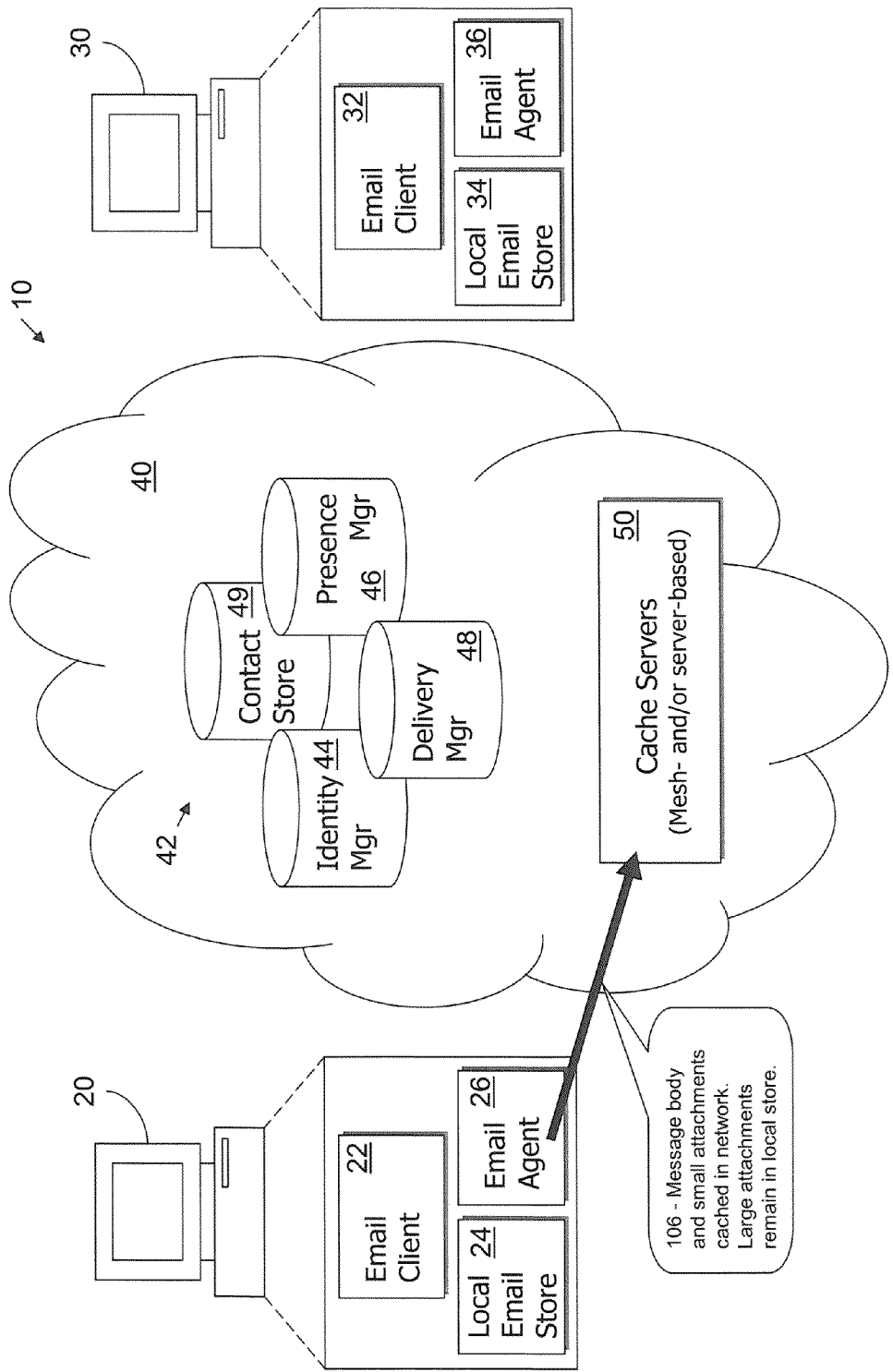
Figure 3E:
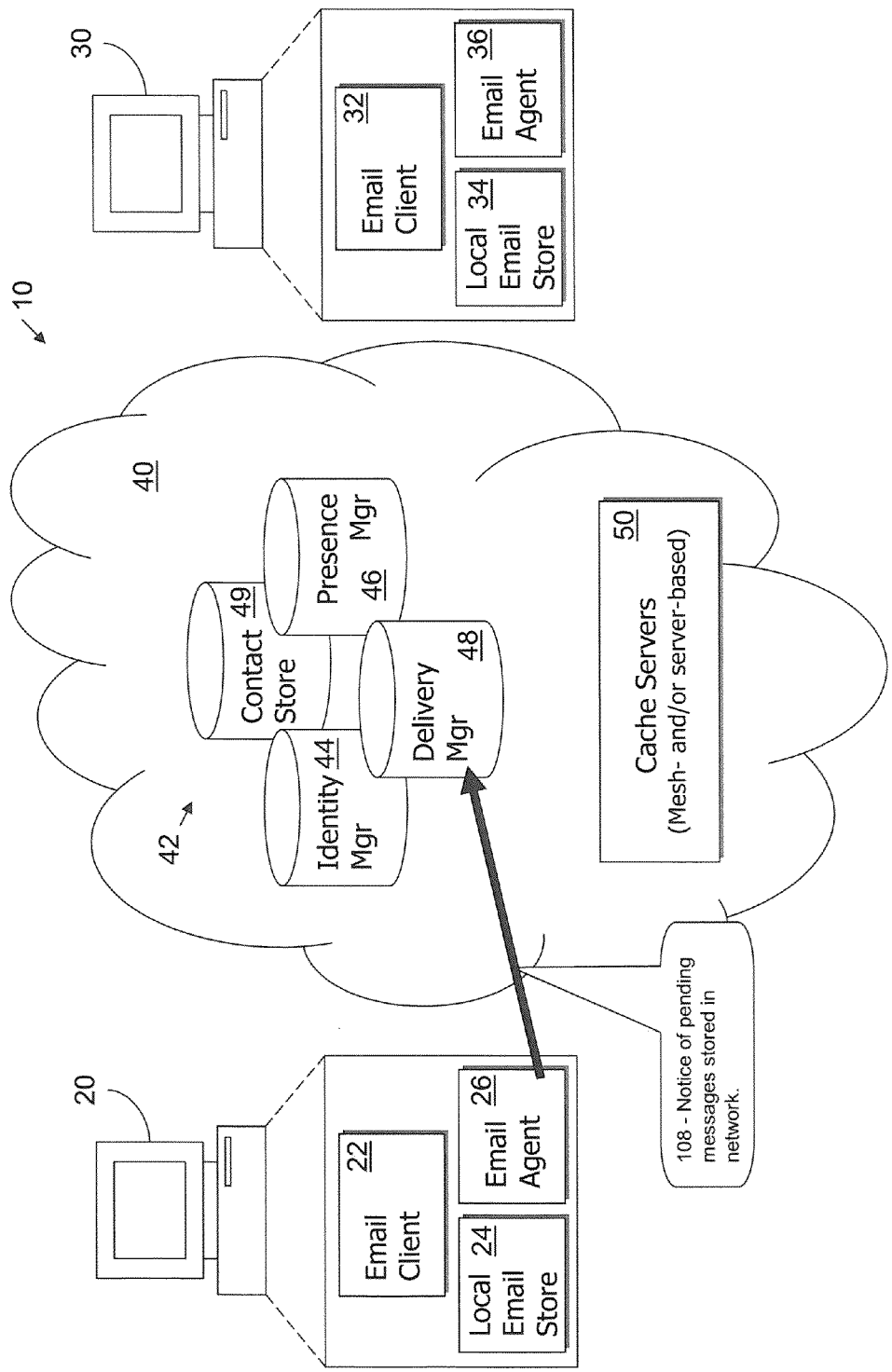

In step 100 shown in FIG. 3A, similar to step 1 of FIG. 2A, email client application 22 submits an email message created by a user to email agent 26. Similar to step 2 in FIG. 2B, in step 102 of FIG. 3B, email agent 26 connects to identity manager 44 to verify the recipient email addresses contained in the email message, and to obtain public keys corresponding to the verified email addresses. And again, in step 104 in FIG.

3C, sender email agent 26 communicates with presence manager 46 to determine whether recipient 30 is online.

In the previous example, recipient 30 was online, and therefore available to receive the email message and attachments directly from sender 20. However, in this example, recipient 30 is offline. Therefore, in step 106 of FIG. 3D, sender email agent 24 may communicate the message body of the email message and any attachments having a size less than a predetermined amount to cache servers 50 residing on network 40. In some embodiments, attachments having sizes greater than the predetermined amount may remain stored locally on sender 20. In step 108 of FIG. 3E, sender email agent 26 may notify delivery manager 48 that there are pending messages stored in network 40, as well as where those pending message may be located (e.g., on which cache servers 50 the message is cached).

In some embodiments, delivery manager 48 may be a central server configured to store information regarding pending P2P email messages stored in network 40. In other embodiments, delivery manager 48 may be a decentralized service such as a DHT or other similar distributed systems.

In some embodiments where delivery manager 48 is a DHT, the names may be recipient email addresses, and the values associated therewith may include information necessary for recipient email agent 36 to obtain pending email messages from network 40. Such information may include address information associated with particular cache servers 50 having cached copies of the pending email. The address information may be a network address of the particular cache servers 50 storing the pending emails, or, if each cache server is merely another node similar to 20 or 30, the address information may be an email address associated with each node.

In other embodiments, each email message or attachment may have a unique Universal Resource Name ("URN"). Recipient email agent 36 may be notified of any URNs associated with email messages or attachments destined for recipient 30. A delivery manager 48 implementing a DHT may use URNs related to pending email messages and attachments as names, and the value(s) associated with each URN may be a Universal Resource Locator ("URL"). The URL may indicate where the email message/attachment identified by a URN may be found, as well as what method may be used to obtain the message/attachment (e.g, ftp://www.yin.com/attachment.jpg indicates that the file 'attachment.jpg' may be obtained from the domain yin.com using the ftp protocol).

Figure 3F:
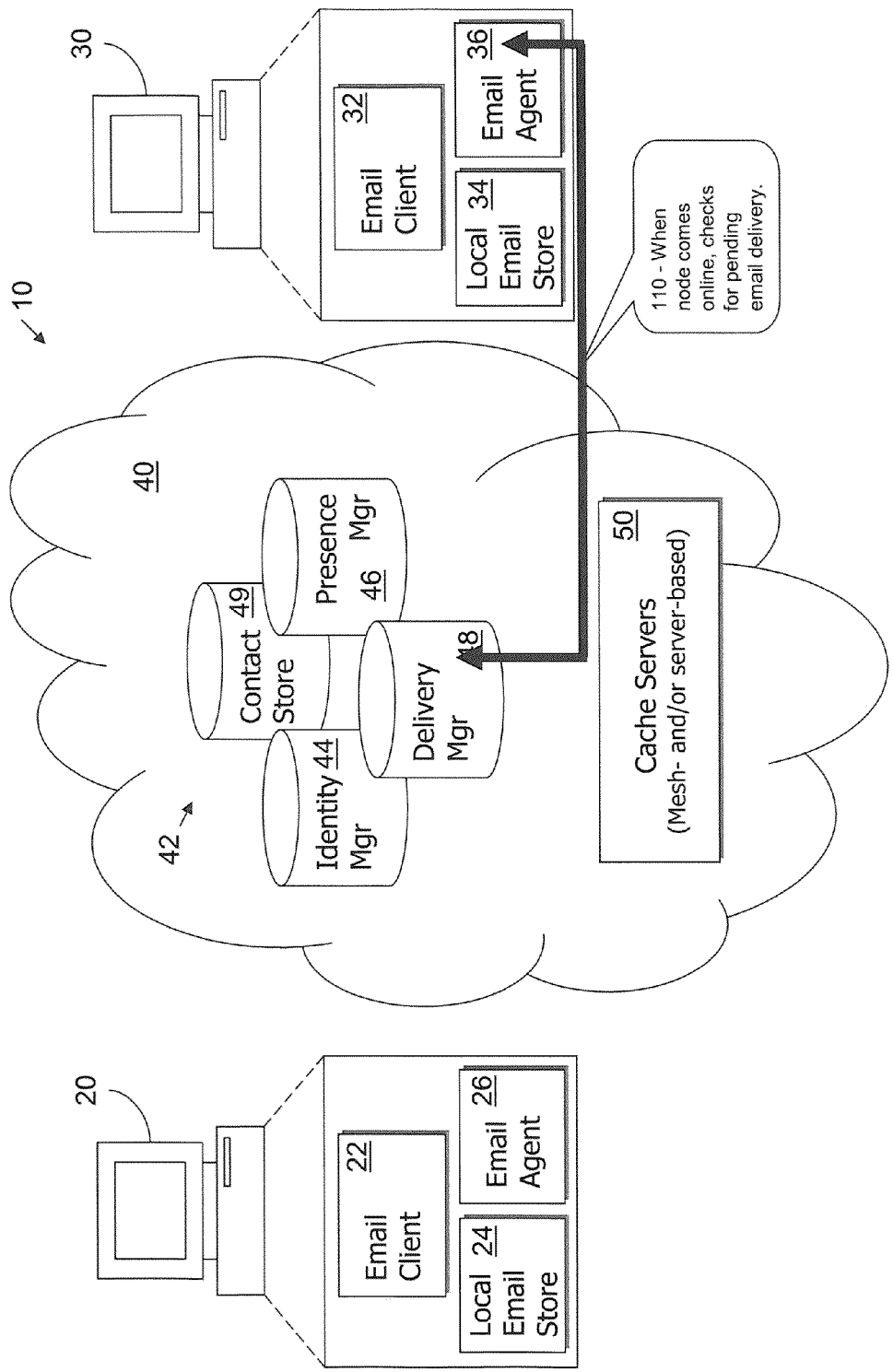

Accordingly, when recipient 30 comes online, in step 110 of FIG. 3F, recipient email agent 36 may communicate with delivery manager 48 to determine whether there are pending email messages on network 40 which are intended for recipient 30 and to identify one or more cache servers 50 where those messages are located. In some embodiments, recipient email agent 36 may next communicate with presence manager 44 to determine which of the identified nodes are currently online and those nodes' network addresses.

Figure 3G:
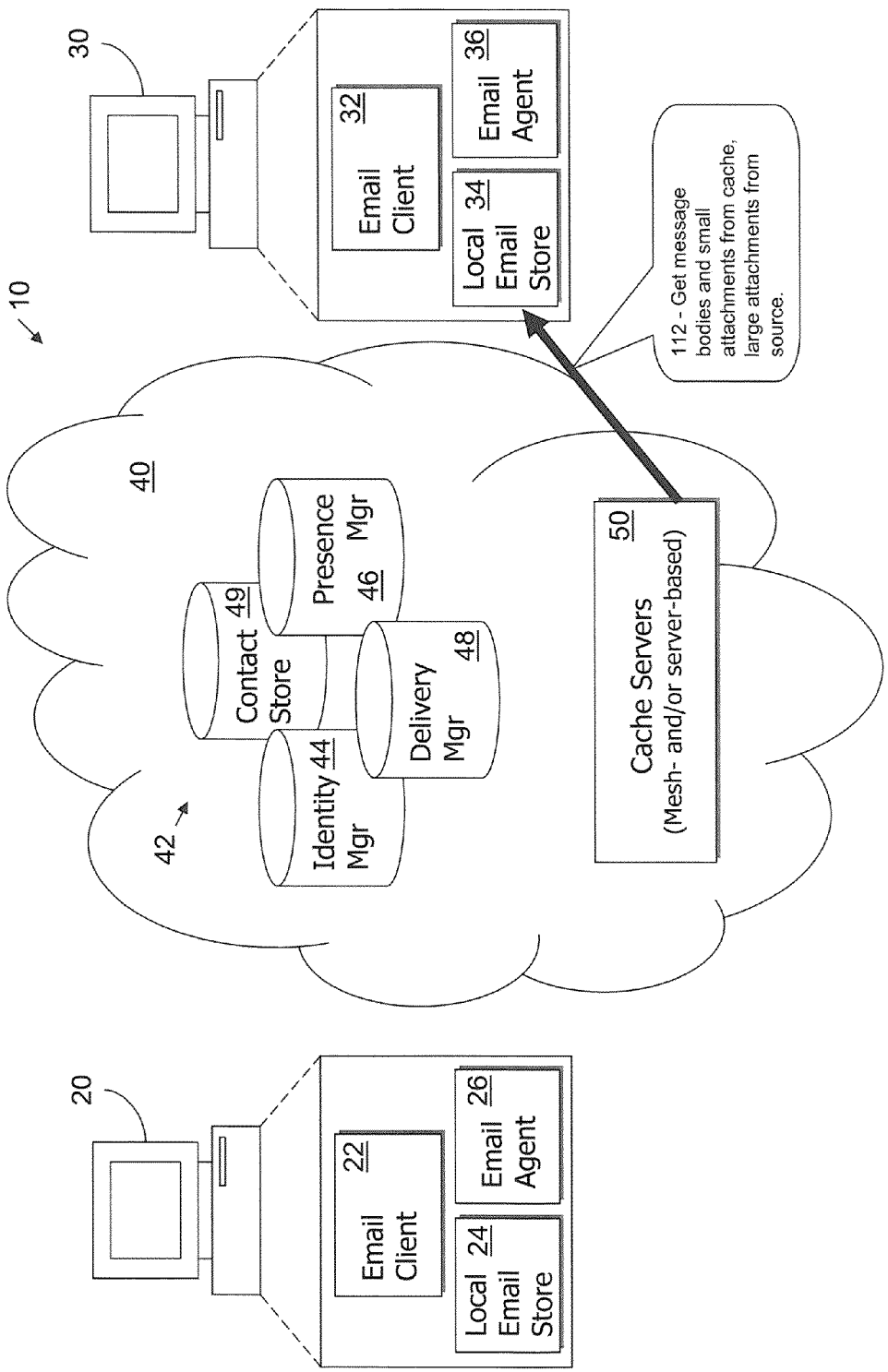

Next, in step 112 of FIG. 3G, recipient local email store 34 (or alternatively, recipient email agent 36) may communicate with the identified nodes of the cache servers 50 to retrieve message bodies and attachments having a size less than the predetermined amount described above.

Attachments larger than the predetermined size may be obtained from the original sender 30, assuming sender 30 is currently online. If sender 20 is not currently online, recipient 30 may periodically query presence manager 46 so that when sender 20 comes back online, recipient 30 may then obtain the large attachment directly from sender 20.

In some embodiments, where local email store 34 or email agent 36 must download multiple emails from cache servers 50, it may prioritize which emails/attachments will be retrieved first. For instance, an email client 32 may provide an interface for a user to edit contacts and sort them by various criterion (e.g., degrees of separation of friendship, age, etc.). Using this priority information, email client 32 or agent 36 may retrieve emails/attachments in the order of which its contacts have been sorted by the user. This priority information may be synchronized with contact store 49 when convenient.

Figure 3H:
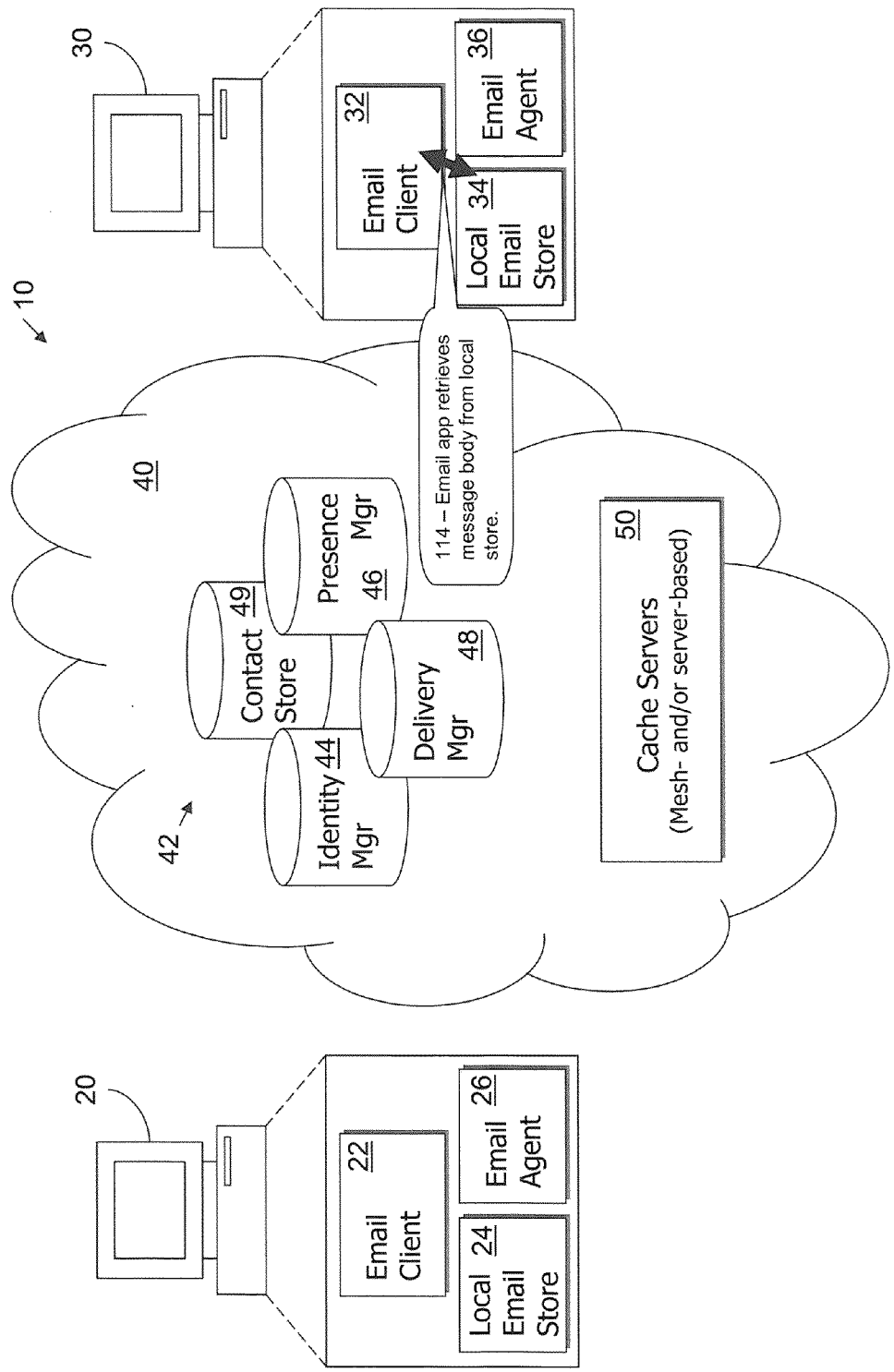

When the user of recipient device wishes to read the received message(s), he or she may use recipient email client 32 to view email messages, including newly received messages, stored in local email store 34 in step 108 of FIG. 3H.

In some embodiments, sender 20 may be configured to verify that recipient 30 received the email address. For instance, recipient email agent 36 may send an acknowledgement to sender 20 once recipient local email store 34 has received and stored the entirety of the email and any attachments thereto. Additionally or alternatively, Sender 20 may query recipient 30 to determine whether recipient 30 received the message. In some embodiments, recipient 30 may notify one of the services in decentralized distributed services 42 (e.g., delivery manager 48) that a message having a particular URN has been delivered. In such a case, sender 20 may verify that the message was received by communicating with the services 42.

Figure 4:
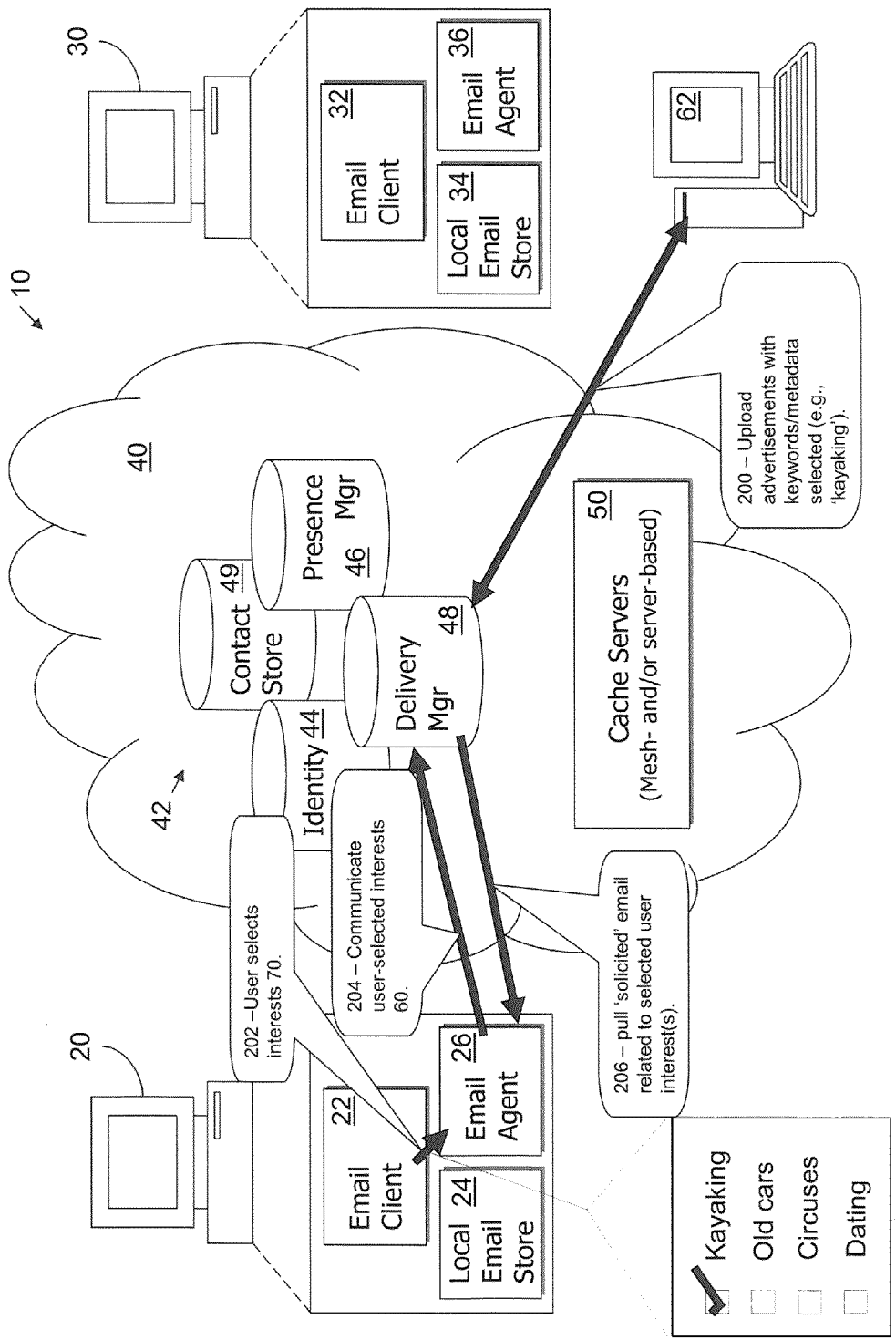
FIG. 4 depicts an example method of preventing unsolicited emails.

In the P2P email system disclosed herein, some embodiments may be configured to prevent unsolicited email and/or provide users with emails related to topics of interest. Turning to FIG. 4, in step 200, an advertiser 62 of a particular interest (e.g., a kayak manufacturer) may communicate with decentralized distributed services 42 to upload advertisement information, which may include metadata such as keywords (e.g., kayak) as well as advertising emails and/or attachments. Email client 22 may include an interface including a list 60 of selectable interests. A user of email client 22 may choose one or more interests from list 60 in step 202, and those choices may be communicated to decentralized distributed services 42 (e.g., to delivery manager 48) in step 204. In step 206, email agent 26 may "pull" down the advertisements uploaded by advertiser 62 in step 200. Note that because sender 20 indicated interest in kayaks, the email sent in step 206 is not unsolicited.

In some embodiments, advertisers such as 62 may be charged a fee for each of their advertisement emails "pulled" from the system 10. Additionally or alternatively, a ratings system similar to those used in television (e.g., Nielsen ratings, which are based on the habits of home TV viewers) may be implemented to ascertain how much a given advertisement is "pulled," for purposes of charging advertisers such as 62.

In another aspect, a user who is away from her computer containing her P2P emails may nevertheless wish to access those emails. In traditional email systems (e.g., SMTP), such a user may have access to a webmail interface, which may comprise a HTML page which the user may access with a web browser. The user may enter her login information (e.g., a username and password), and upon successful authentication, the webpage may direct the user's web browser to a second webpage which allows the user to view, manipulate, and create/send new email messages. This second web page may obtain email data from and interface with the same mail server (containing the user's mailbox) which the user would normally log into with her local computer.

Figure 5:
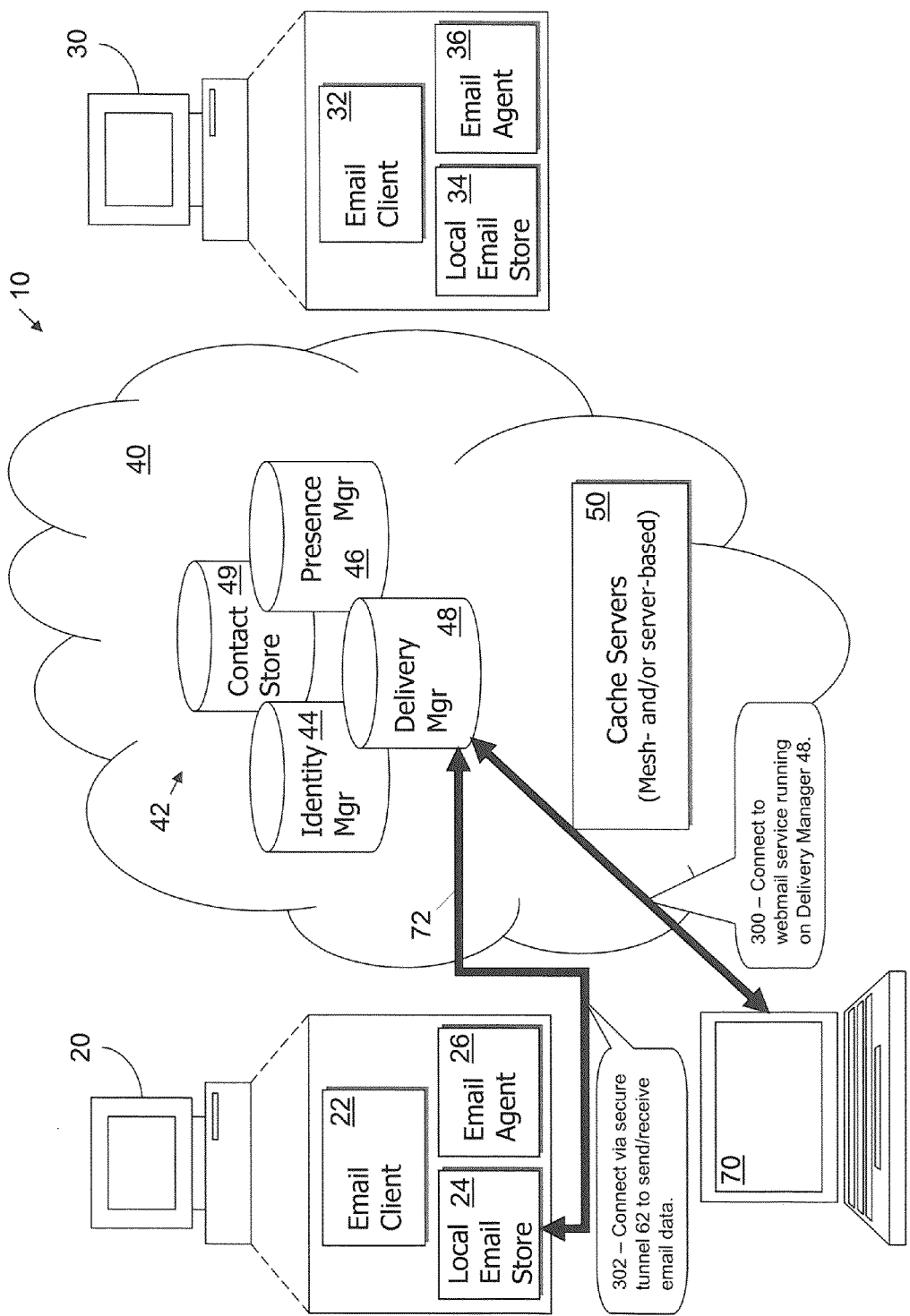
FIG. 5 depicts a computer using webmail from a remote location to obtain a user's email from his or her computer.

Webmail access similarly may be possible in some embodiments of the disclosed P2P email system 10. Referring to FIG. 5, a user may be away from her computer 20, but may wish to access email on her local email store 24 using a remote computer 70. A central server or one of the decentralized distributed services 42 (such as delivery manager 48) may include a webmail service. In step 300, the user may connect to the webmail service executing on decentralized distributed services 42 and provide login credentials to a login webpage. Upon successful authentication, the user may be redirected to a second webpage giving the user email access. Instead of communicating with the user's mailbox on a central SMTP server, however, in step 302, the second webpage may communicate with the user's local email store 24 through a secure tunnel 72 to the user's computer 20.

Although the above examples only describe the exchange of email messages between two node computers on P2P system 10, those skilled in the art will understand that communications may occur between any number of node computers. Moreover, communications may occur between a node computer on P2P system 10 and a traditional email system (e.g., hotmail, gmail, etc.).

For example, one of the decentralized distributed services (e.g., a separate gateway server which is not shown) may be identified as a mail exchanger (MX) in a DNS. The Gateway server therefore may receive email messages/attachments sent from traditional email systems, destined for a recipient residing on the disclosed P2P email system 10, and communicate those messages to the appropriate recipients using the above-described methods (depending on whether the user is online or offline).

Likewise, if a user on a node computer of P2P email system 10 desires to send an email message to an outside traditional email address, the user may communicate the message and any attachments to the gateway server. The gateway server may forward the message to the appropriate SMTP server using MX records in the DNS. In some embodiments, identity manager 44 may be configured with an index of domains that are part of P2P email system 10. When sender 20 verifies the email address, such as in step 2 in FIG. 2B or step 102 in FIG. 3B, identity manager 44 may determine whether the recipient email address(es) are within the P2P email system 10. If so, the process may proceed as described above. If a recipient email address is destined for an outside domain unrelated to the P2P email system 10, however, sender 20 may be required to forward the email and any attachments to the gateway server for delivery to the outside domain.

In another aspect of the disclosure, the P2P email system 10 may provide efficient attachment distribution. In some instances, instead of using base64 to encode attachments to 7-bit representations, the P2P email system 10 may determine the URLs of attachments and make those URLs available through decentralized distributed services 42. For instance, assume sender 20 sends an email message including a large attachment (i.e., too large to be stored on cache servers 50) to recipient 30. Also assume recipient 30 is online simultaneously with sender 20. The email received by recipient 30 may not include the large attachment, encoded using Base64 or otherwise. Instead, the email received by recipient 30 may include a hyperlink (URL) to a location on sender 20 containing the large attachment, so that recipient 30 may initiate a connection to sender 20 and download the large attachment directly (e.g., using FTP, HTTP, BitTorrent, or other well-known transfer protocols). The initiation of the file transfer may not require intervention by the user of recipient 30. Instead, recipient email client 32 may be configured to automatically initiate the transfer when the user opens the email or attachment.

Accordingly, while embodiments have been particularly shown and described with reference to the foregoing disclosure, many variations may be made therein. The foregoing embodiments are illustrative, and no single feature or element is essential to all possible combinations that may be used in a particular application. Where the disclosure recites "a" or "a first" element or the equivalent thereof, such disclosure includes one or more such elements, neither requiring nor excluding two or more such elements. Further, ordinal indicators, such as first, second or third, for identified elements are used to distinguish between the elements, and do not indicate or imply a required or limited number of such elements, and do not indicate a particular position or order of such elements unless otherwise specifically stated.

What is claimed is:

1. A method for facilitating peer-to-peer email exchange, the method comprising the steps of:

implementing a plurality of node computers in selective communication with one another, thereby forming a network, each of said node computers configured for sending an at least one email message to a select at least one of the other node computers;

implementing an at least one cache server in selective communication with the node computers and configured for temporarily storing at least a portion of the at least one email message when the node computer of an at least one receiving user of said at least one email message is not online; and upon a sending user of a first one of the node computers desiring to send an email message, including any file attachments thereto, to an at least one receiving user of another one of the node computers:

determining whether the node computer of each of the at least one receiving user is online;

for each of the at least one receiving user, upon determining that the node computer of said receiving user is online:

transmitting the email message and any file attachments thereto directly to the online node computer of said receiving user; and upon receipt, storing the email message and any file attachments thereto in memory on the online node computer of said receiving user; and for each of the at least one receiving user, upon determining that the node computer of said receiving user is not online:

transmitting the email message to at least one of the at least one cache server and the online node computer of at least one other receiving user for later retrieval;

transmitting any file attachments thereto having a size less than a predefined maximum size to at least one of the at least one cache server and the online node computer of at least one other receiving user for later retrieval;

storing any file attachments thereto having a size greater than the predefined maximum size in memory on the node computer of the sending user;

upon the node computer of said receiving user subsequently going online, notifying said node computer of the existence and locations of the pending email message and any file attachments thereto; and retrieving from at least one of the online node computer of the sending user, the at least one cache server and the online node computer of at least one other receiving user the email message and any file attachments thereto and storing said email message and file attachments in memory on the node computer of said receiving user.

2. The method of claim 1, further comprising the steps of:
implementing an email client in memory on each node computer, said email client configured for allowing a user to draft, send and receive email messages;
implementing a local email store in memory on each node computer, said email store configured for storing email messages and any file attachments thereto; and
implementing an email agent in memory on each node computer, each said email agent configured for communicating with email agents of other node computers, thereby allowing for the transmission of the email messages and any file attachments thereto directly between the email clients of two or more node computers.

3. The method of claim 2, further comprising the steps of:
implementing an identity manager in selective communication with each node computer and configured for storing a network address of the user of each node computer along with associated encryption keys;
implementing a presence manager in selective communication with each node computer and configured for monitoring the online status of each node computer;
implementing a delivery manager in selective communication with each node computer and configured for monitoring the locations of any email messages and associated file attachments thereto that are pending delivery to the node computers of one or more receiving users; and
implementing a contact store in selective communication with each node computer and configured for storing contact information related to each node computer and the associated users thereof.

4. The method of claim 3, further comprising the step of, upon the sending user desiring to send an email message, including any file attachments thereto, to the at least one receiving user, obtaining from the identity manager an at least one encryption key associated with the network address of each of the at least one receiving user for use in encrypting the email message and any file attachments thereto.

5. The method of claim 3, further comprising the steps of, for each receiving user, upon determining that the node computer of said receiving user is not online:
notifying the delivery manager of the existence and respective locations of the pending email message and any file attachments thereto; and
querying the presence manager to determine which of the at least one cache server and node computer storing the email message and any file attachments thereto is currently online.

6. The method of claim 1, wherein the step of retrieving and storing the email message and any file attachments thereto further comprises the steps of:
retrieving from at least one of the at least one cache server and the online node computer of at least one other receiving user the email message and any file attachments thereto, having a size less than the predefined maximum size, and storing said email message and file attachments in memory on the node computer of said receiving user;
upon determining that the node computer of the sending user is online, retrieving from the node computer of the sending user any file attachments thereto having a size greater than the predefined maximum size and storing said file attachments in memory on the node computer of said receiving user; and
upon determining that the node computer of the sending user is not online, retrieving from the at least one online node computer of another receiving user any file attachments thereto having a size greater than the predefined maximum size and storing said file attachments in memory on the node computer of said receiving user.

7. The method of claim 1, further comprising the step of, upon receipt of the email message and any file attachments thereto, sending an acknowledgement receipt message to the node computer of the sending user.

8. The method of claim 1, further comprising the step of automatically forwarding the email message and any file attachments thereto from a one of the cache servers to an at least one further one of the cache servers deemed to be relatively closer to the at least one node computer of the at least one receiving user.

9. The method of claim 1, further comprising the step of, upon a one of the cache servers going offline, automatically forwarding any pending email messages and file attachments thereto stored by said cache server to an at least one other online cache server.

10. The method of claim 1, wherein the step of implementing an at least one cache server in selective communication with each node computer further comprises the step of implementing an at least one cache server in memory on at least one of the node computers.

11. A method for facilitating peer-to-peer email exchange, the method comprising the steps of:
implementing a plurality of node computers in selective communication with one another, thereby forming a network, each of said node computers configured for sending an at least one email message to a select at least one of the other node computers;
implementing an at least one cache server in selective communication with the node computers and configured for temporarily storing at least a portion of the at least one email message when the node computer of an at least one receiving user of said at least one email message is not online; and
upon a sending user of a first one of the node computers desiring to send an email message, including any file attachments thereto, to an at least one receiving user of another one of the node computers:
determining whether the node computer of each of the at least one receiving user is online;
for each of the at least one receiving user, upon determining that the node computer of said receiving user is online:
transmitting the email message and any file attachments thereto directly to the online node computer of said receiving user; and
upon receipt, storing the email message and any file attachments thereto in memory on the online node computer of said receiving user; and
for each of the at least one receiving user, upon determining that the node computer of said receiving user is not online:
transmitting the email message to at least one of the at least one cache server and the online node computer of at least one other receiving user for later retrieval;
transmitting any file attachments thereto having a size less than a predefined maximum size to at least one of the at least one cache server and the online node computer of at least one other receiving user for later retrieval;
storing any file attachments thereto having a size greater than the predefined maximum size in memory on the node computer of the sending user;
upon the node computer of said receiving user subsequently going online, notifying said node computer of the existence and locations of the pending email message and any file attachments thereto;

retrieving from at least one of the at least one cache server and the online node computer of at least one other receiving user the email message and any file attachments thereto, having a size less than the predefined maximum size, and storing said email message and file attachments in memory on the node computer of said receiving user;

upon determining that the node computer of the sending user is online, retrieving from the node computer of the sending user any file attachments thereto having a size greater than the predefined maximum size and storing said file attachments in memory on the node computer of said receiving user; and upon determining that the node computer of the sending user is not online, retrieving from the at least one online node computer of another receiving user any file attachments thereto having a size greater than the predefined maximum size and storing said file attachments in memory on the node computer of said receiving user.

12. A system for facilitating peer-to-peer email exchange between a sending user and an at least one receiving user, the system comprising:

a plurality of node computers in selective communication with one another, thereby forming a network, each of said node computers configured for sending an at least one email message to a select at least one of the other node computers; and an at least one cache server in selective communication with the node computers and configured for temporarily storing at least a portion of the at least one email message when the node computer of an at least one receiving user of said at least one email message is not online;

wherein, upon the sending user of a first one of the node computers desiring to send an email message, including any file attachments thereto, to the at least one receiving user of another one of the node computers, said node computers are configured for:

determining whether the node computer of each of the at least one receiving user is online;

for each of the at least one receiving user, upon determining that the node computer of said receiving user is online:

transmitting the email message and any file attachments thereto directly to the online node computer of said receiving user; and upon receipt, storing the email message and any file attachments thereto in memory on the online node computer of said receiving user; and for each of the at least one receiving user, upon determining that the node computer of said receiving user is not online:

transmitting the email message to at least one of the at least one cache server and the online node computer of at least one other receiving user for later retrieval;

transmitting any file attachments thereto having a size less than a predefined maximum size to at least one of the at least one cache server and the online node computer of at least one other receiving user for later retrieval;

storing any file attachments thereto having a size greater than the predefined maximum size in memory on the node computer of the sending user;

upon the node computer of said receiving user subsequently going online, notifying said node computer of the existence and locations of the pending email message and any file attachments thereto; and retrieving from at least one of the online node computer of the sending user, the at least one cache server and the online node computer of at least one other receiving user the email message and any file attachments thereto and storing said email message and file attachments in memory on the node computer of said receiving user.

13. The system of claim 12, further comprising:

an email client in memory on each node computer, said email client configured for allowing a user to draft, send and receive email messages;

a local email store in memory on each node computer, said email store configured for storing email messages and any file attachments thereto; and an email agent in memory on each node computer, each said email agent configured for communicating with email agents of other node computers, thereby allowing for the transmission of the email messages and any file attachments thereto between the email clients of two or more node computers.

14. The system of claim 13, further comprising:

an identity manager in selective communication with each node computer and configured for storing a network address of each user of the node computers along with associated encryption keys;

a presence manager in selective communication with each node computer and configured for monitoring the online status of each node computer;

a delivery manager in selective communication with each node computer and configured for monitoring the locations of any email messages and associated file attachments thereto that are pending delivery to the node computers of one or more receiving users; and a contact store in selective communication with each node computer and configured for storing contact information related to each node computer and the associated users thereof.

15. The system of claim 14, wherein the node computers are further configured for, upon the sending user of the first one of the node computers desiring to send an email message, including any file attachments thereto, to be received by the at least one receiving user of at least one of the other node computers, obtaining from the identity manager an at least one encryption key associated with the network address of each of the at least one receiving user for use in encrypting the email message and any file attachments thereto.

16. The system of claim 14, wherein the node computers are further configured for, upon determining that a given node computer of a receiving user is not online:

notifying the delivery manager of the existence and respective locations of the pending email message and any file attachments thereto; and querying the presence manager to determine which of the at least one cache server and node computer storing the email message and any file attachments thereto is currently online.

17. The system of claim 12, wherein the node computers are further configured for:

retrieving from at least one of the at least one cache server and the online node computer of at least one other receiving user the email message and any file attachments thereto, having a size less than the predefined maximum size, and storing said email message and file attachments in memory on the node computer of said receiving user;

upon determining that the node computer of the sending user is online, retrieving from the node computer of the sending user any file attachments thereto having a size greater than the predefined maximum size and storing said file attachments in memory on the node computer of said receiving user; and upon determining that the node computer of the sending user is not online, retrieving from the at least one online node computer of another receiving user any file attachments thereto having a size greater than the predefined maximum size and storing said file attachments in memory on the node computer of said receiving user.

18. The system of claim 12, wherein the node computers are further configured for, upon receipt of the email message and any file attachments thereto, sending an acknowledgement receipt message to the node computer of the sending user.

19. The system of claim 12, wherein the node computers are further configured for automatically forwarding the email message and any file attachments thereto from a first one of the cache servers to an at least one further one of the cache servers deemed to be relatively closer to the at least one node computer of the at least one receiving user.

20. The system of claim 12, wherein the node computers are further configured for, upon a one of the cache servers going offline, automatically forwarding any pending email messages and file attachments thereto stored by said cache server to an at least one other online cache server.

* * * * *